Oct. 29, 1968  A. J. SCALZO  3,408,048
DIAPHRAGM SEALING STRUCTURE
Filed May 26, 1967  2 Sheets-Sheet 1

WITNESSES
Helen M. Farkas
James F. Young

INVENTOR
Augustine J. Scalzo
BY
Frank Cristiano Jr.

United States Patent Office 3,408,048
Patented Oct. 29, 1968

3,408,048
DIAPHRAGM SEALING STRUCTURE
Augustine J. Scalzo, Philadelphia, Pa., assignor to Westinghouse Electric Corporation, Pittsburgh, a corporation of Pennsylvania
Filed May 26, 1967, Ser. No. 641,565
7 Claims. (Cl. 253—78)

ABSTRACT OF THE DISCLOSURE

A sealing arrangement for a diaphragm of an axial flow, elastic fluid machine, such as a gas turbine or an air compressor in which an annular array of seal segments are carried in a seal housing structure and the seal housing is slidably carried by the inner shroud of the diaphragm and keyed thereto for relative radial movement to permit free thermal expansion to occur without stress in the associated components and without adversely affecting concentricity of the seal segments.

Background of the invention

In axial flow elastic fluid machines, such as turbines or compressors, the bladed diaphragms are provided with annular inner shrouds which encompass the bladed rotor of the machine and are provided with seal members to minimize leakage of elastic fluid around the diaphragm blades. In many percent arrangements, the seal members are rigidly connected to the inner shrouds, thus necessitating large radial clearances to accommodate eccentricity due to relative thermal expansion of the components.

Transient thermal expansion effects are especially acute in gas turbines, since the rise in temperature during operation is on the order of 1000° F. or more. Although such expansion may be readily accommodated by providing sufficient radial clearance between the seal members and the rotor, the rate of leakage of motive gases therepast becomes a considerable factor in lowering the efficiency of the turbine.

Summary

Briefly, in accordance with the invention, there is provided a bladed diaphragm for an axial flow gas turbine, or the like, in which the inner shroud ring of the diaphragm is provided with an annular array of radially inwardly extending rib portions and an annular array of arcuately segmented seal members are carried by an annular seal housing structure having a pair of annular radially outwardly extending rib portions. The ribs on the shroud are slidably confined between the pairs of ribs on the seal housing and are provided with radially extending slots keyed to the pair of ribs by keys carried by the pair of ribs and slidably received in the slots, to prevent relative circular movement.

The diaphragm shroud is divided into arcuate segments each of which is attached to a group of diaphragm blades in the annular blade array.

The diaphragm structure is preferably divided into semicircular half portions to facilitate assembly in the casing halves and onto the bladed rotor of the machine. Accordingly, the seal segments and the seal housing structure are formed to accommodate the above assembly. However, at least two seal segments are provided in each diaphragm half and provided with the above keying arrangement.

When the machine is intended for use with its rotor axis disposed in a horizontal plane, the keying means may be omitted between the seal housing structure and the inner shroud in the upper diaphragm half.

Description of the preferred embodiment

Figure 1:
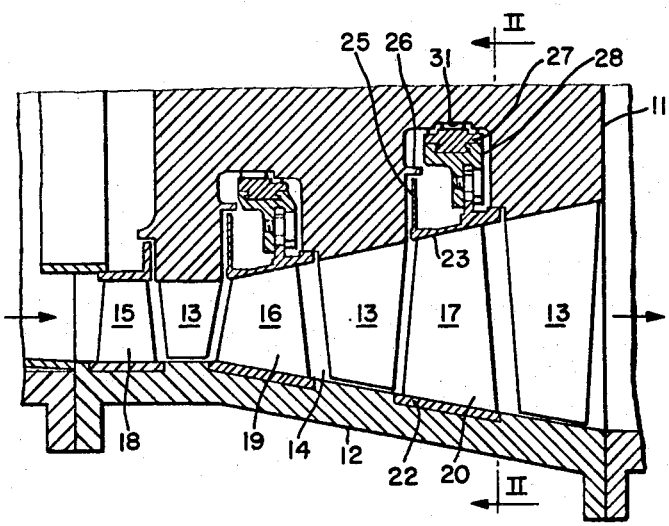
FIGURE 1 is an axial sectional view, taken on line I—I of FIG. 2, of a gas turbine incorporating the invention.
Figure 2:
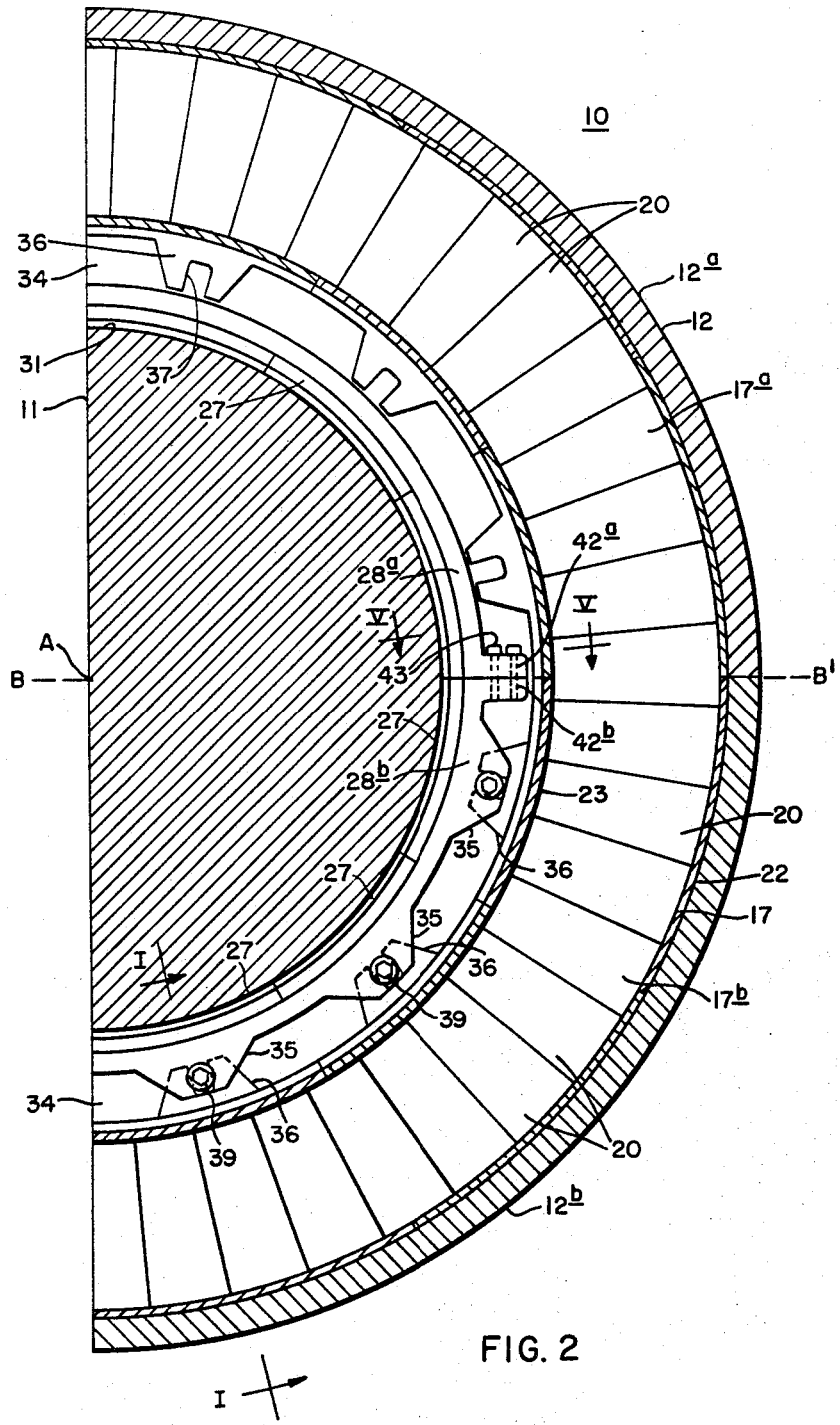
FIG. 2 is a cross-sectional view taken on line II—II of FIG. 1 and showing the upper and lower right quadrants of the turbine.

Referring to the drawings in detail, especially FIGS. 1 and 2, there is shown a gas turbine 10, comprising a rotor 11 disposed within a tubular casing structure 12 of circular cross-section and supported in a central position in any suitable manner (not shown) for rotation about its central axis A.

The rotor 11 is provided with a plurality of rows (three in this instance) of rotor blades 13 disposed in annular arrays. The rotor 11 and the casing 12 jointly define an annular passage 14 through which hot motive gases, such as the products of combustion from suitable combustion apparatus (not shown) are directed, as indicated by the arrows. Within the casing 12 there is provided a plurality of stationary diaphragm structures or assemblies 15, 16 and 17. The diaphragm structures 15, 16 and 17 are each provided with an annular array of stationary blades or nozzle ranges 18, 19 and 20 disposed upstream with respect to the direction of motive gas flow of the associated rotor blades 13.

The rotor blades 13 extend radially outwardly across the gas passageway 14, while the stationary blades 18, 19 and 20 are mounted to the inner periphery of the casing 14 and extend radially inwardly across the gas passageway. Accordingly, in the illustration, the gas turbine has three stages or three sets of stationary and rotating blades, and in operation hot motive gases flow past the three stages to motivate the rotor 11 by energy imparted to the rotor blades 13 in three stages of expansion and is then exhausted therefrom in a substantially vitiated state.

The hot motive gases enter the turbine at relatively high temperatures on the order of 1200° F., and with present technology the temperatures range in some installations may be as high as about 1900° F. Accordingly, it will now be evident that during operation, all of the turbine components undergo a great rise in temperature above atmospheric with attendant thermal expansion. Since the temperature rise of the components and the coefficients of expansion are not uniform, thermal stresses of high magnitudes can occur with attendant distortion of components and rubbing between rotating and stationary components.

In accordance with the invention the diaphragm 17 is provided with an outer annular shroud ring 22 and an inner shroud ring structure 23 connected to the stationary blades 17. As best shown in FIG. 2, the outer and inner shroud rings are divided into equal arcuate segments of about 30°. Accordingly, there are provided, in this instance, twelve groups of blades forming the annular array of blades in the diaphragm structure 17.

The inner shroud ring structure 23 is provided with an annular radially inwardly extending seal flange 25 disposed in closely spaced relation with an annular shoulder 26 on the rotor 11 to jointly therewith provide an initial restriction to leakage of motive fluid therepast.

Figure 4:
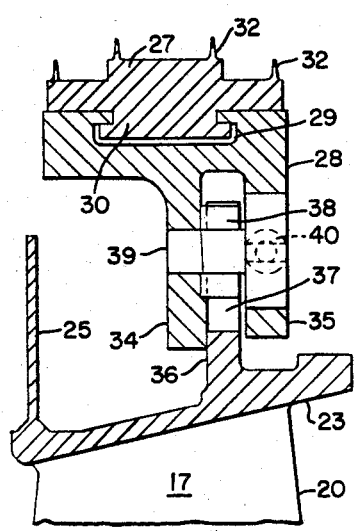
FIG. 4 is a sectional view taken on line IV—IV of FIG. 3.

The primary leakage restricting structure, however, comprises an annular array of seal members or shoes 27 formed as arcuate segments conforming to the arcuate extent of the inner shroud segments (i.e. about 30°) and are floatingly carried by an annular seal housing 28, as more clearly shown in FIG. 4.

The seal housing structure is provided with an annular keyway 29 and the seal segments 27 are provided with annular keying portions 30 slidably retained therein. If desired, to minimize rubbing contact with the mating seal surface 31 on the rotor (FIG. 1), the seal segments may be provided with fine annular teeth or ridges 32. As well known in the art, the teeth 32 are further effective to provide a tortuous fluid leakage path therepast.

Figure 3:
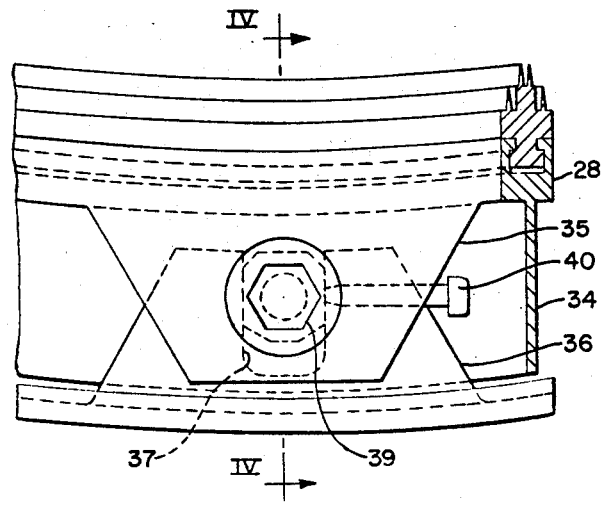
FIG. 3 is an enlarged fragmentary view showing a portion of the structure shown in FIG. 2.
Figure 5:
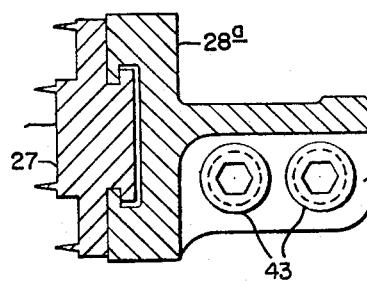
FIG. 5 is a sectional view taken on line V—V of FIG. 2.

The seal housing 28 is provided with an annular radially outwardly extending rib portion 34 and an annular array of rib portions 35 axially spaced therefrom and disposed in parallel relation with each other. The inner shroud structure 23, on the other hand, is provided with an annular array of rib portion 36 extending radially inwardly and slidably received or confined between the rib portions 34 and 35. In the embodiment shown, the rib portions 35 and 36 are not annularly continuous but are formed as a series or array of annularly spaced projections of generally trapezoidal form (as best shown in FIG. 3) and disposed in lapping registry with each other. However, they may, if desired, be annularly continuous as is the rib 34. Accordingly, in the claims the term "annular rib portion" is intended to generically cover "annularly continuous" and "annular array of" rib portions.

The shroud rib portion 36 is provided with a radially extending open-ended slot 37 in which a keying member or block 38 is disposed. The block 38 is immovably connected to the rib portions 34 and 35 by a suitable pin 39 extending through the block and received in the rib portion 34. The pin 39 may be locked against axial movement by a suitable lock screw 40.

With the above arrangement, as the blades 20 and other components of the diaphragm 17 expand in radial directions due to the heating effect of the hot motive gases during operation of the turbine, the seal housing structure 28 is substantially unaffected by such movement, since such movement is permitted to occur by movement of the keying blocks 38 in the slots 37. Also, as the seal housing structure 28 expands thermally, free movement thereof is permitted to occur by the key and slot arrangement 38, 37.

It will be noted that the above freedom of movement is permitted in radial direction but movement in circumferential or peripheral direction is restricted by the keys and slots 38, 37.

Accordingly, the seal segments 27 are always maintained in substantially concentric relation with the mating seal surface 31 on the rotor, regardless of relative thermal expansion of the diaphragm components, thereby permitting the locating of the seal segments in closely spaced relation with the seal surface 31 without the fear of rubbing, heretofore induced by distortion of the components and/or thermal stresses induced by relative thermal expansion of the components.

As best illustrated in FIG. 2, the casing 12 is preferably axially divided into upper and lower halves 12a and 12b along a horizontal plane B-B' for convenience of assembly at the factory and disassembly for servicing, as known in the art.

Also, the diaphragm 17 is divided into upper and lower halves 17a and 17b, with the upper half 17a positioned in the upper casing half 12a and the lower half 17b positioned in the lower half. Accordingly, the seal housing halves 28a and 28b in the upper and lower diaphragm halves 17a and 17b are provided with two pairs of diametrically disposed suitable mating flanges 42a, 42b (only the right-hand pair shown) secured to each other at assembly by bolts 43.

The gas turbine 10, is preferably adapted to operate with its rotor axis A in a horizontal plane. For such service, the upper diaphragm half 17a does not require radial keying. Accordingly, by referring to FIG. 2, it will be seen that under such circumstances, the keying blocks 38, pins 39 and lock screws 40 may be omitted in the upper half 17a and are only employed in the lower diaphragm half 17b.

The diaphragm structure 16 may be substantially identical to the diaphragm structure 17 and need not be further described. Also, as indicated in FIG. 1, the first stage diaphragm 15 may be of any conventional form, if desired. In other words, the invention may be employed in a multi-stage turbine, as indicated in FIG. 1 and may be incorporated in one or more of the stationary diaphragms, as desired.

It will now be seen that the invention provides a simple yet highly effective sealing arrangement for a high temperature elastic fluid utilizing machine of the axial flow type in which distortion due to thermal stresses is substantially eliminated and in which leakage of fluid past the diaphragms is restricted in a highly effective manner.

I claim as my invention:

1. An axial flow elastic fluid machine, comprising:
   a casing of circular cross-section,
   a rotor disposed in an axial position within said casing and jointly therewith defining an annular elastic fluid passage,
   an annular array of blades carried by said rotor and extending radially outwardly across said passage,
   a diaphragm assembly disposed within said casing in encompassing concentric relation with said rotor and having an annular array of stationary blades extending across said passage and disposed in cooperative relation with said rotor blades,
   said diaphragm further including an arcuately segmented annular inner shroud ring structure, each of said shroud ring segments carrying a plurality of said stationary blades and having a rigid annular radially inwardly extending rib portion,
   said rotor having a peripheral seal surface of circular cross-section encompassed by said rib portion;
   an annular array of arcuately segmented seal segments,
   an annular seal housing structure carrying said seal segments in sealing relation with said seal surface,
   said seal housing structure having a rigid radially outwardly extending rib portion disposed in freely slidable surface abutment with said inwardly extending rib portion, and
   keying means cooperatively associated with said rib portions for permitting radial movement of said seal housing structure but restraining circular movement of said seal housing structure.

2. The structure recited in claim 1 and further including:
   a third rigid annular rib portion provided in one of the structures in axially spaced relation with the other rib portion on said one structure and jointly therewith substantially confining the rib on the other of the structures to said radial movement.

3. The structure recited in claim 1 wherein:
   one of the structures is provided with at least one slot extending in a radial direction; and
   the keying means includes a key carried by the other structure and slidably received in said slot.

4. The structure recited in claim 1 wherein:
   the arcuately segmented shroud ring structure is divided into at least four segments, and
   the keying means includes slot and keying means associated with at least two of said four segments.

5. The structure recited in claim 2 wherein:
   the confined rib is provided with at least one radially extending slot, and
   the keying means includes a pin connected to said confining ribs and a key, said key being rotatably carried by said pin between said confining ribs and slidably received in said slot.

6. The structure recited in claim 4 wherein:

the casing is arranged for operation with its central axis extending horizontally, the arcuately segmented shroud ring structure is divided into at least two segments disposed below said central axis and the remaining segments are disposed above said central axis, and the keying means is associated with the two segments disposed below the central axis.

7. The structure recited in claim 6 wherein:

the casing and the diaphragm structure are divided into upper and lower semicircular halves.

References Cited

UNITED STATES PATENTS

| | | |
|---|---|---|
| 2,488,867 | 11/1949 | Judson. |
| 2,556,890 | 6/1951 | Thorn. |
| 2,919,104 | 12/1959 | Blyth. |
| 2,996,279 | 8/1961 | Lorett et al. |
| 3,018,085 | 1/1962 | Welsh. |
| 3,300,180 | 1/1967 | Tuttle et al. |

EVERETTE A. POWELL, JR., *Primary Examiner.*